United States Patent [19]  [11] Patent Number: 4,683,930
Elam et al.  [45] Date of Patent: Aug. 4, 1987

[54] LOCKING CONFIGURATION FOR A WHEEL RIM FLANGE RETAINING RING

[75] Inventors: Paul A. Elam, Akron; Jack W. Keller, Mogadore, both of Ohio

[73] Assignee: Goodyear Aerospace Corporation, Akron, Ohio

[21] Appl. No.: 793,351

[22] Filed: Oct. 31, 1985

[51] Int. Cl.⁴ ............................................. B60B 25/18
[52] U.S. Cl. ................................ 152/410; 301/35 SL
[58] Field of Search ............................... 152/408, 410; 301/35 SL

[56] References Cited

U.S. PATENT DOCUMENTS

| | | | |
|---|---|---|---|
| 1,049,442 | 1/1913 | Booth | 152/410 |
| 3,608,607 | 9/1971 | Gerbeth | 152/410 |
| 4,209,052 | 6/1980 | French | 152/410 |
| 4,552,194 | 11/1985 | Brown et al. | 152/410 |

Primary Examiner—David A. Scherbel
Attorney, Agent, or Firm—P. E. Milliken; L. A. Germain

[57] ABSTRACT

A split retaining ring for locking a separable tire bead flange on a wheel rim has inboard and outboard facing portions and two circumferentially aligned terminal ends, each terminal end characterized by an outboard facing tab having a drilled-through bore. A buckle member having a pair of apertures is mounted on the retaining ring such that each tab passes through a respective aperture and the buckle functions to maintain the terminal ends of the retaining ring in a specific orientation when it is mounted on a wheel rim. A wire fastener is positioned through each drilled bore in a tab to retain the buckle member on the split retaining ring.

2 Claims, 9 Drawing Figures

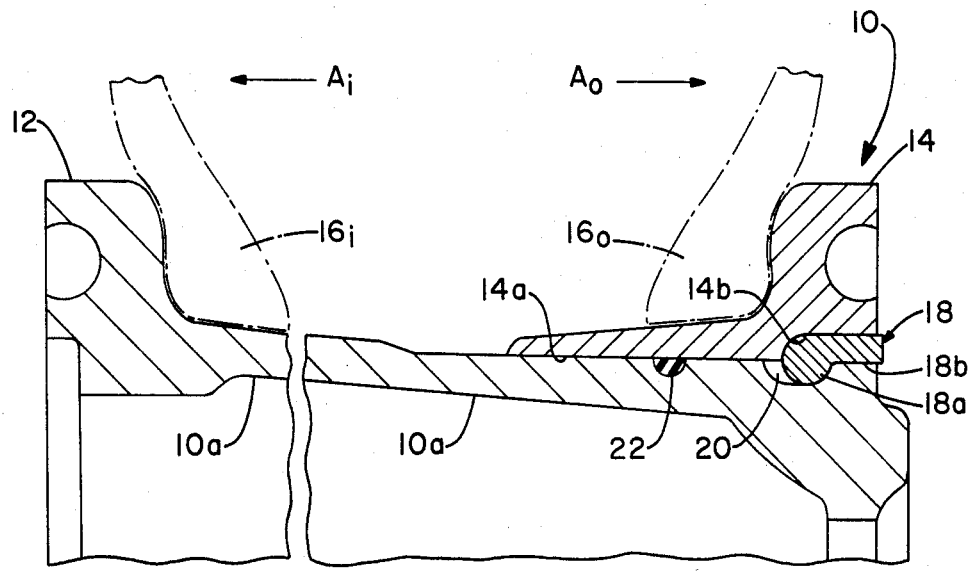
Prior Art
FIG.—1
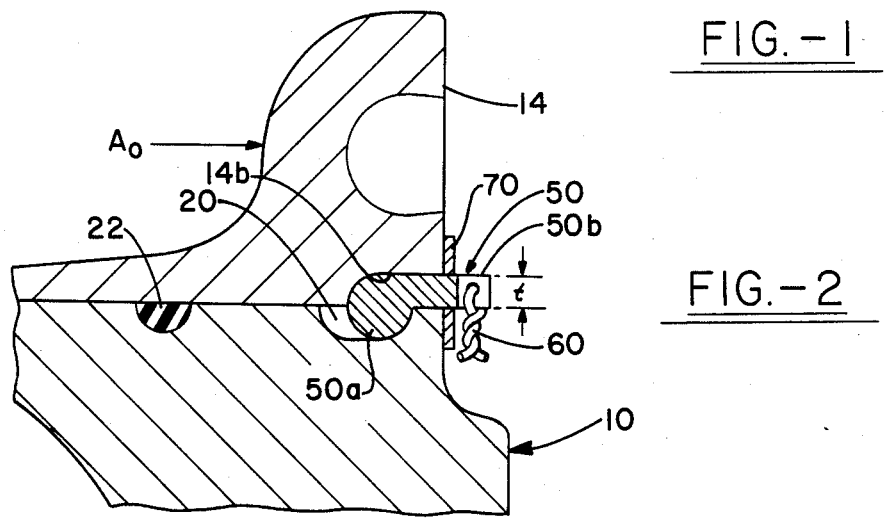
FIG.—2
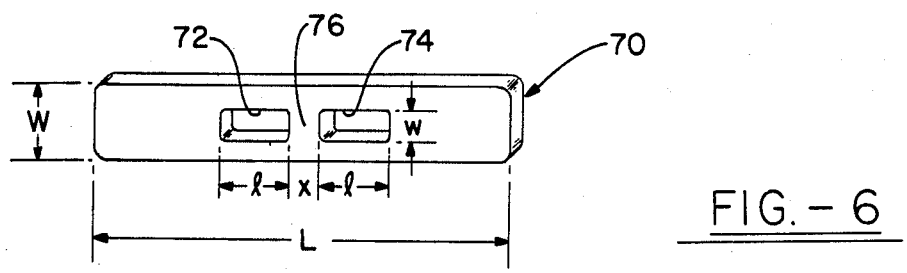
FIG.—6

LOCKING CONFIGURATION FOR A WHEEL RIM FLANGE RETAINING RING

BACKGROUND OF THE INVENTION

This invention pertains to wheel assemblies and more particularly to a wheel rim wherein an outboard positioned tire bead flange is designed to be separable from the main portion of the wheel rim. The separable outboard bead flange is secured on the wheel rim by means of a retaining ring received within an annular groove in the rim.

More particularly this invention pertains to a unique configuration for a wheel rim flange retaining ring and means to lock the ring on the rim in an emergency situation when such wheel is rotating at high speed, the mounted tire is deflated, and high centrifugal forces are present which tend to throw the retaining ring off of the wheel rim.

In a wheel assembly of this type, a deflated tire is firstly mounted on the wheel rim followed by the separable bead flange and finally by the retaining ring. Upon inflation of the mounted tire, the outboard tire bead forces the separable bead flange into contacting and locking engagement with the retaining ring. Alternatively, when the tire is deflated, the retaining ring is firstly removed followed by the separable bead flange and finally the deflated tire.

In the circumstance of a tire blowout when traveling at high speed, the outboard tire bead tends to work inboardly allowing the separable bead flange to follow in the same direction. Accordingly, the forceful engagement between the separable flange and retaining ring is lost and the ring may be thrown off of the wheel rim by the high centrifugal forces which are present. This, of course, results in a dangerous and serious situation especially as these type wheel assemblies are used for aircraft applications.

SUMMARY OF THE INVENTION

In light of the foregoing, it is in accordance with one aspect of the invention an object to provide a retaining ring configuration for a wheel assembly having a separable bead flange, which configuration provides locking of the retaining ring on the rim in the absence of a properly inflated tire and during the period of high centrifugal force such that the separable bead flange and tire are preserved on the wheel rim.

Accordingly, the invention is directed to a configuration for a split retaining ring having inboard and outboard facing portions and two circumferentially aligned terminal ends, each terminal end characterized by an outboard facing tab having a drilled bore;

a buckle member having a pair of longitudinally oriented apertures mounted on the retaining ring such that each tab passes through a respective aperture and the terminal ends of the ring are in a circumferentially spaced-apart relationship to each other; and fastener means mounted in the drilled tab bores to prevent removal of the buckle member.

BRIEF DESCRIPTION OF THE DRAWINGS

For a complete understanding of the invention, reference should be made to the following detailed description and the accompanying drawings, in the several figures of which like reference numerals indicate like elements and in which:

FIG. 1 is a partial sectional view of a prior art wheel rim showing a typical separable outboard bead flange and retaining ring configuration;

FIG. 2 is a greatly enlarged partial elevational view, in cross-section, showing a separable bead flange and retaining ring configuration in accordance with this invention;

FIG. 6 is a view of a buckle member which serves to maintain the terminal ends of the retaining ring in a specific spacial orientation;

DETAILED DESCRIPTION OF THE INVENTION

Figure 3:
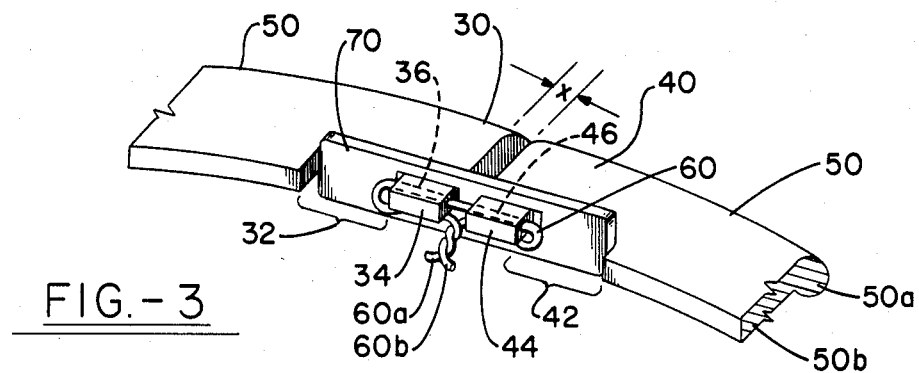
FIG. 3 is a perspective view of the terminal end portion of the retaining ring shown in FIG. 2 illustrating the locking arrangement.

Referring firstly to FIG. 1 of the drawings, a prior art wheel rim is generally indicated by reference numeral 10, which wheel rim has designated inboard and outboard directions as indicated by reference arrows Ai and Ao respectively. It should be understood at the outset that FIG. 1 is a generalized showing of a wheel rim having a separable outboard tire bead flange and a flange retaining ring and is not intended to limit the invention to a particular wheel design or individual part configuration, there being numerous such designs within the prior art and known to persons working in the art. This invention therefore, may be applied to many of the prior art configurations. In any event, the wheel rim 10 conventionally includes an inboard tire bead flange 12 which is formed as part of the main body portion 10a of the rim 10 and a separable outboard tire bead flange 14 which is removable from the main body portion 10a in the direction of the arrow Ao. The tire beads are shown via ghost lines as they may be mounted in a tire-inflated condition on the wheel rim 10, the inboard bead being indicated by reference numeral 16i while the outboard bead is indicated by reference numeral 16o.

The separable bead flange 14 is an annular piece that is slidably received on the rim 10 in the inboard direction of arrow Ai and is thereafter retained on the rim by reason of a split retaining ring 18 positioned outboardly of the separable bead flange 14. The retaining ring 18 is characterized by an inboard bulbous portion 18a that is shown having a substantially circular cross-section but may have any geometrical cross-section, and a substantially flat lip or flange portion 18b that extends in the outboard direction when said retaining ring is mounted on the wheel rim 10. The bulbous portion 18a is seated in a mating annular groove 20 provided in the rim 10 while the bore 14a of the separable bead flange 14 has an annular groove 14b which effects an abutting engagement with the retaining ring 18 when forced to move outboardly on the rim as the mounted tire is inflated. An annular seal indicated at 22 may also be provided to maintain the leakproof integrity as between the separable bead flange 14 and the body portion 10a of the wheel rim 10.

From the foregoing description and a consideration of FIG. 1, it will be appreciated that a deflated tire may be easily mounted on the wheel rim 10 in the inboard direction of arrow Ai and thereafter the separable bead flange 14 and retaining ring 18 are mounted on the rim. Upon inflation of the mounted tire, the separable bead flange 14 is moved outboardly by the outboard tire bead 16o to engage the retaining ring 18 in a forceful manner. Seating of the bulbous portion 18a of the retaining ring 18 in the annular rim groove 20 locks the separable bead flange 14 on the wheel rim. Alternatively, it will be appreciated that when the wheel 10 is rotating at high speed, a deflated tire will allow the outboard tire bead 16o to move inboardly which in turn allows the separable bead flange 14 to also move in the same direction. In this circumstance, the locked and abutting engagement between the flange 14 and the retaining ring 18 is lost and the high centrifugal forces which are present will tend to expand the split retaining ring 18 sufficient to throw it free from its seating in the groove 20 and off of the wheel rim 10. The separable bead flange 14 and tire may then also be forced off of the rim creating a very dangerous and hazardous situation.

Now therefore, the present invention provides a unique configuration for a retaining ring 18 having means to lock the ring on the wheel rim during the period of high centrifugal force such that the separable bead flange 14 and tire are retained on the wheel rim. Referring to FIGS. 2, 3, and 6 of the drawings, a retaining ring generally indicated by numeral 50 is illustrated in accordance with the teaching of this invention. While the retaining ring 50 may have any cross-sectional geometric configuration without departing from the invention, it is shown in the drawing as having a simple bulbous portion 50a of a circular cross-section which extends into a flange 50b having a thickness "t", and this in the conventional manner of the prior art retaining ring 18 as illustrated in FIG. 1. Mounting of the retaining ring 50 is accomplished in similar fashion and such mounted ring is shown in FIG. 2 as it is received in an annular rim groove 20 by way of its bulbous portion 50a while the flange 50b extends in the outboard direction of arrow $A_o$. Of course, the removable rim flange 14 is locked onto the wheel rim 10 by its interference at 14b with the retaining ring 50 when a tire bead (not shown) of an inflated tire exerts a force on the rim flange 14 in the outboard direction.

FIG. 3 is a perspective view of a portion of the retaining ring 50, the portion being taken in the area where the ring is split such that a gap indicated at "x" exists between terminal ends 30 and 40 of the ring 50. The locking configuration of this invention comprises machining, or otherwise removing by any conventional practice, a portion of the retaining ring 50 in the area of its flange 50b such as to define tab ends in the ring 50. A portion indicated at 32 is removed from the terminal end 30 to define a tab 34 while a portion indicated at 42 is removed from terminal end 40 to define a tab 44. The tab end 34 has a circumferentially oriented, formed or drilled, bore 36 and the tab end 44 has a similiarly formed or drilled bore 46 which is in circumferential alignment with the bore 36. A lockwire 60 is fed through the aligned bores 36,46 and it has its terminal ends 60a and 60b twisted together in a conventional manner to thus maintain the retaining ring terminal ends 30,40 in a particular alignment.

A buckle member indicated at 70 forms a part of the locking arrangement and it is more specifically shown in FIG. 6 of the drawings. The buckle member 70 comprises a substantially flat piece of metal stock having a width "W" that is wider than the thickness "t" of the retaining ring flange portion 50b. Further, the buckle member 70 has a length "L" that is substantially defined by the combined lengths of the retaining ring portions 32,42,34,44 and the distance "x" shown in FIG. 3. The buckle member 70 is characterized by longitudinally oriented apertures 72 and 74 which define a rib 76 between them. The rib 76 corresponds to the gap "x" which exists between the terminal ends 30,40 as clearly evident in FIG. 3. Each aperture 72,74 has a length "l" that is slightly longer than the circumferential extent of the retaining ring tab ends 34,44 such that when the buckle member 70 is positioned or mounted on the retaining ring and the tab ends 34,44 are seated through respective apertures, the ring 50 may be expanded slightly in the circumferential direction. Of course, when a lockwire 60 is fed through the tab end bores 36,46 the buckle member may not be removed from its position on the retaining ring 50 but upon being rotated at high speed in its mounting on a wheel rim 10, the centrifugal forces will radially expand the retaining ring 50 against the separable flange bore indicated at 14b in FIG. 1.

Figure 4:
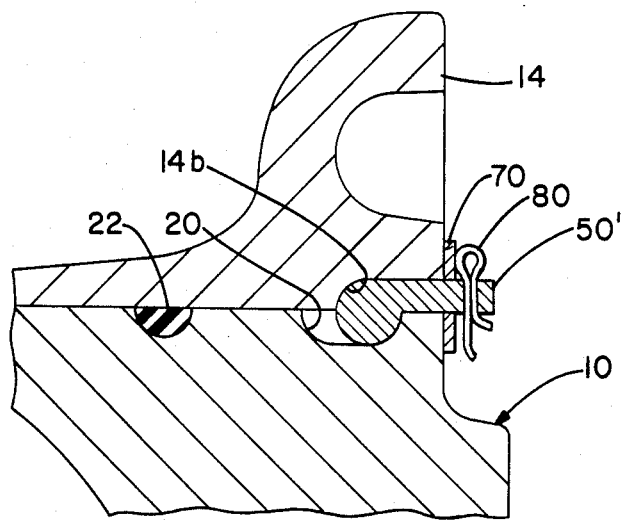
FIG. 4 is a greatly enlarged partial elevational view similar to FIG. 2, showing a separable bead flange and retaining ring configuration forming a second embodiment of the invention.
Figure 5:
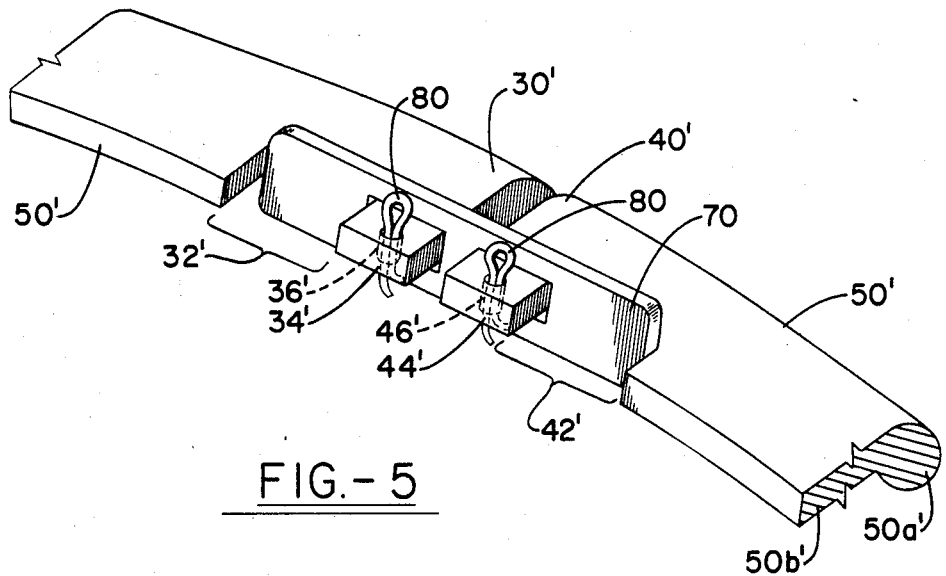
FIG. 5 is a perspective view of the terminal end portion showing the locking arrangement of the FIG. 4 configuration.
Figure 7:
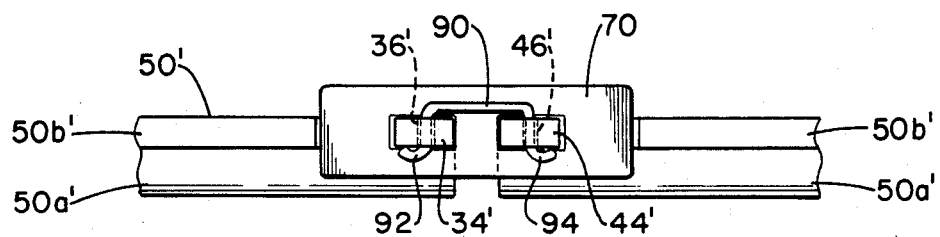
FIG. 7 is a partial elevational view of the retaining ring shown in FIGS. 4 and 5 as may be taken from the outboard side looking inboardly and showing a wire brad or staple fastener.

FIGS. 4 and 5 of the drawings illustrate an alternative embodiment wherein a retaining ring 50' has terminal end tabs 34',44' having drilled through bores 36',46' which are radially rather than circumferentially oriented. In this configuration, a lockwire may be passed through the bores 36',46' in similar fashion as the lockwire 60 of FIGS. 2 and 3 but a preferred arrangement comprises mounting a cotter pin 80 in each of the bores 36',46'. Alternatively, a suitable wire staple 90 as shown in FIG. 7 may be used in place of either a continuous lockwire or the individual cotter pins. The staple 90 will have its leg portions 92,94 bent circumferentially in line with the retaining ring 50' to thus secure it on the tabs 34',44'.

Figure 8:
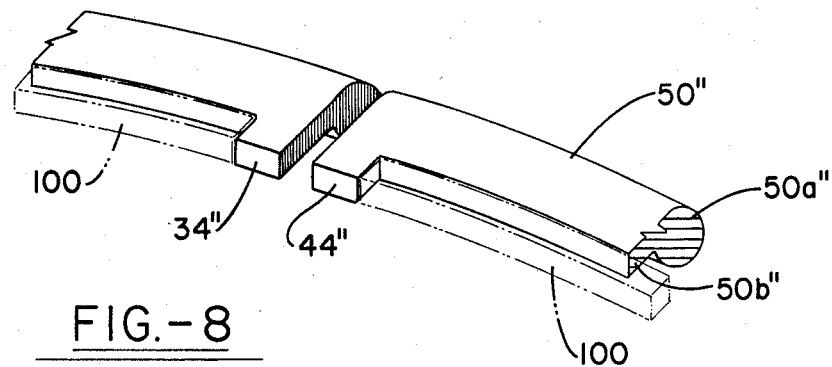
FIG. 8 is a perspective view similar to FIG. 3 showing an alternative configuration for forming the tab ends of the retaining ring.
Figure 9:
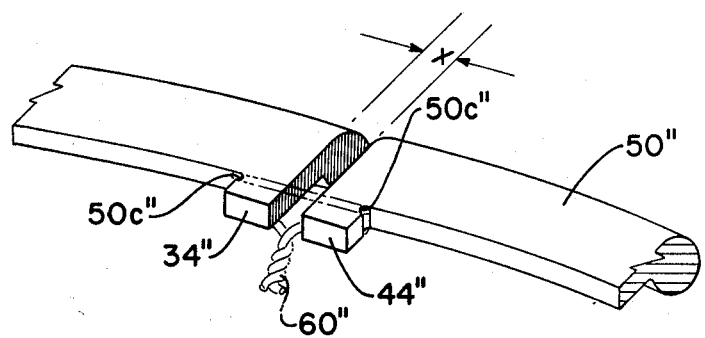
FIG. 9 is a perspective view similar to FIG. 8 showing an alternative wire locking configuration.

FIGS. 8 and 9 of the drawings illustrate an alternative configuration for the retaining ring wherein a weight savings may be realized by removing flange material 50b in excess of what is indicated by the areas 32,42 and 32',42' in FIGS. 3 and 5 respectively. Accordingly, a retaining ring 50" has tab ends 34",44" formed by machining or otherwise removing the annular extent of the flange material 50b", the removed material being indicated in ghost lines by reference numeral 100. The tab ends 34",44" may be secured on a wheel rim by a buckle member 70 and suitable fastener means in similar fashion as the embodiments of FIGS. 3 and 5 or such may be secured by a lockwire 60" as shown in FIG. 9. In this circumstance, a lockwire groove 50c is machined or otherwise formed in the transition area between the base of each tab end 34",44" and the retaining ring flange 50b" and this is to prevent the lockwire 60" from being forced off of the terminal end tabs 34",44".

The purpose of the gap between the retaining ring terminal ends indicated at "x" and indicated in FIGS. 3-9 is to provide a predetermined amount of expansion of the split retaining ring when it is subjected to initial high centrifugal forces. In this condition, the buckle member 70 is not subjected to such initial high forces because of the additional length "l" designed into the apertures 72, 74. By the time the retaining ring expands sufficiently such that the each terminal end tab engages the circumferential extent of its respective aperture, the period of high centrifugal force is passed and the wheel is rotating at a slower rate of speed. It should be appreciated that in this configuration, the outside diameter of the retaining ring prior to centrifugal expansion is no greater than the diameter of the mating separable rim flange bore 14b. Further, the retaining ring may be easily rotated by hand within the wheel grove 20 prior to inflation of the mounted tire and forceful engagement is made with the rim flange 14. This is, of course, advantageous in the mounting and demounting procedures of the separable rim flange and retaining ring assembly.

Finally, from the foregoing description it will be appreciated by those knowledgeable in this art that the invention offers various advantages over the present state of the art. For example, the original shape and/or configuration of the retaining ring 18 is fairly maintained i.e., there are no added appendages welded to the ring and no separate complex pieces are required to accomplish the locking arrangement. Further, the buckle member and various fasteners are readily available and/or manufactured and relatively inexpensive when compared to other retaining ring locking configurations which are used and practiced in the art. Thus, and for safety sake, the buckle member and fasteners may be used just once and discarded upon demounting of the separable bead flange and tire. A new buckle member and fasteners are used when remounting the wheel assembly and these then exhibit their full physical strength qualities.

In addition to the above advantages it is important in the aircraft wheel application that a mechanic and/or pilot may easily determine the state of a wheel assembly. Accordingly, the existance of a fastener and the buckle member is easily seen while the absence of either one indicates a questionable wheel assembly. In this regard, the inventors envision that the buckle member and/or fasteners may be painted with a high visibility color such that pilot inspection of the wheel is easily accomplished.

While certain representative embodiments and details have been shown for the purpose of illustrating the invention, it will be apparent to those skilled in the art that various changes and modifications may be made therein without departing from the spirit or scope of the invention.

What is claimed is:

1. In a wheel rim assembly having an inboard bead flange and a separable outboard bead flange and a retaining ring having a split defining circumferentially oriented terminal ends, said retaining ring having an inboard facing bulbous portion and an outboard facing flange portion, the inboard facing portion being received within an annular groove in the rim to secure the separable bead flange on the rim, an improved configuration for a locking retaining ring comprising in combination:

a tab defined in the outboard facing flange portion of each terminal end in the retaining ring, each said tab having a drilled bore through the material comprising the tabs;

a buckle member having a pair of longitudinally oriented and spaced-apart apertures defining a rib between them, which rib establishes a predetermined gap between the terminal ends of the retaining ring when said buckle member is mounted on the retaining ring flange portion and each tab is received through one such aperture and each aperture length is slightly greater than the circumferential extent of each said defined tab such that the retaining ring may expand in the radial direction to the limit of the aperture lengths; and fastening means positioned through each tab bore to prevent removal of the buckle member.

2. The configuration for a locking retaining ring as set forth in claim 1 wherein each tab in a terminal end of the retaining ring is defined by removing the circumferential portion of the retaining ring flange from one terminal-end-defined tab to the other.

* * * * *